US012035166B2

(12) United States Patent
Zou et al.

(10) Patent No.: US 12,035,166 B2
(45) Date of Patent: Jul. 9, 2024

(54) UNSUPERVISED WIFI-ENABLED DEVICE-USER ASSOCIATION FOR PERSONALIZED LOCATION-BASED SERVICE

(71) Applicants: THE REGENTS OF THE UNIVERSITY OF CALIFORNIA, Oakland, CA (US); NANYANG TECHNOLOGICAL UNIVERSITY, Singapore (SG)

(72) Inventors: Han Zou, Berkeley, CA (US); Costas Spanos, Lafayette, CA (US); Yuxun Zhou, Chicago, IL (US); Jianfei Yang, Singapore (SG)

(73) Assignees: THE REGENTS OF THE UNIVERSITY OF CALIFORNIA, Oakland, CA (US); NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 17/056,940

(22) PCT Filed: May 23, 2019

(86) PCT No.: PCT/US2019/033782
§ 371 (c)(1),
(2) Date: Nov. 19, 2020

(87) PCT Pub. No.: WO2019/226910
PCT Pub. Date: Nov. 28, 2019

(65) Prior Publication Data
US 2021/0136617 A1    May 6, 2021

Related U.S. Application Data

(60) Provisional application No. 62/675,485, filed on May 23, 2018.

(51) Int. Cl.
*H04W 28/02* (2009.01)
*G16Y 10/75* (2020.01)
*H04L 67/50* (2022.01)

(52) U.S. Cl.
CPC ....... *H04W 28/0226* (2013.01); *H04L 67/535* (2022.05); *H04W 28/0215* (2013.01); *H04W 28/0236* (2013.01); *G16Y 10/75* (2020.01)

(58) Field of Classification Search
CPC ......... H04W 28/0226; H04W 28/0215; H04W 28/0236; H04L 67/22; G16Y 10/75
See application file for complete search history.

(56) References Cited

U.S. PATENT DOCUMENTS

2007/0139269 A1* 6/2007 Chen .................... G01S 5/02528
342/450
2013/0218974 A1* 8/2013 Cao ......................... H04W 4/08
709/204
(Continued)

FOREIGN PATENT DOCUMENTS

WO  WO-2005040980 A2 * 5/2005 ............. H04L 67/34
WO       2017139376 A1    8/2017
(Continued)

OTHER PUBLICATIONS

International Search Report and Written Opinion, PCT/US2019/33782, dated Sep. 4, 2019.

*Primary Examiner* — Mehmood B. Khan
(74) *Attorney, Agent, or Firm* — McCoy Russell LLP

(57) ABSTRACT

A mobile device and user association system can include wireless routers to execute software for capturing data including received signal strength (RSS) values and media access controller (MAC) addresses for a number of mobile devices (MDs) from existing wireless fidelity (WiFi) traffic. The system can also include a server to receive the RSS values and MAC addresses of the MDs to estimate a location (Continued)

of each MD and generate historical location data of each MD, identify and filter out temporary MDs, classify each non-temporary MDs as either a static device (SD) or a mobile phone (MP), and associate a user with each SD and MP.

17 Claims, 6 Drawing Sheets

(56) References Cited

U.S. PATENT DOCUMENTS

| | | | |
|---|---|---|---|
| 2014/0107846 A1* | 4/2014 | Li | H04W 4/33 |
| | | | 700/275 |
| 2014/0162686 A1* | 6/2014 | Lee | H04W 64/003 |
| | | | 455/456.1 |
| 2014/0203914 A1* | 7/2014 | Sadr | G01S 13/878 |
| | | | 340/10.1 |
| 2015/0281955 A1* | 10/2015 | Zhang | H04W 4/021 |
| | | | 726/4 |
| 2016/0379074 A1* | 12/2016 | Nielsen | G06T 7/292 |
| | | | 348/143 |
| 2017/0059687 A1* | 3/2017 | Dinesh | G01S 5/02521 |
| 2017/0359697 A1* | 12/2017 | Bhatti | G01C 21/206 |
| 2018/0098188 A1* | 4/2018 | Stern | H04W 4/02 |

FOREIGN PATENT DOCUMENTS

| | | | | |
|---|---|---|---|---|
| WO | WO-2017139376 A1 * | 8/2017 | | H04Q 9/00 |
| WO | WO-2019232441 A1 * | 12/2019 | | G01S 11/06 |

* cited by examiner

UNSUPERVISED WIFI-ENABLED DEVICE-USER ASSOCIATION FOR PERSONALIZED LOCATION-BASED SERVICE

CROSS REFERENCE TO RELATED APPLICATIONS

This application is a 371 of International Patent Application No. PCT/US2019/033782 filed May 23, 2019, which claims priority to and the benefit of U.S. Provisional Patent Application No. 62/675,485 filed May 23, 2018, the contents of which are incorporated herein by reference in their entirety.

BACKGROUND

In this era of the Internet of Things (IoT), the identity and mobility of a user is the most vital prerequisite information for realizing tailored context-aware services and location-based services in a smart home and smart buildings. Such services may facilitate not only location-dependent personalized thermal comfort (e.g., adjustments for lighting and temperature) but they may also improve the energy efficiency of the building(s). Moreover, targeted notification of utility usage (e.g., real-time usage of conference rooms and other areas of the building) and user preference implementations on nearby electronic devices can be achieved for user convenience with the correct user identity information. Service management such as wireless fidelity (WiFi) Internet access can be further optimized based on a user's activity patterns.

Existing user identification schemes require active cooperation of users or a dedicated infrastructure to be deployed, both of which are intrusive and inconvenient for ubiquitous implementation. For instance, both specific hardware and a user's physical interactions are needed for systems using biometric signatures (e.g., fingerprint and iris scans) even though they can provide high identification accuracy.

The main problems for vision-based approaches (e.g., face recognition or gait recognition) are privacy concerns and the needs of favorable lighting conditions. On the other hand, with the pervasiveness of WiFi-enabled mobile devices (MDs) and the wide availability of WiFi infrastructure, estimating a user's identity by analyzing the trace of the MD carried by the user becomes feasible. For instance, the probe requests broadcast from MDs, which contain both received signal strength (RSS) and media access controller (MAC) address of the MD, have been leveraged for MD and user association. Nevertheless, it is impractical to allow the MD to broadcast the probe requests continuously, especially when it has already connected to a WiFi network.

Thus, there remains a need for an unsupervised learning scheme that is able to determine the correct mapping between each WiFi-enabled MD and its user identification using data frames transmitted in the existing WiFi traffic and does not require user active participation.

SUMMARY

Implementations of the disclosed technology are generally directed to a WiFi-enabled, non-intrusive mobile device (MD) and user association systems and methods for inferring a particular user's identity and mobility by way of a novel unsupervised association learning algorithm.

DETAILED DESCRIPTION

Implementations of the disclosed technology are generally directed to a wireless fidelity (WiFi)-based non-intrusive indoor positioning system (generally referred to herein as WinIPS) that is able to estimate the location of each WiFi-enabled mobile device (MD) using existing commercial off-the-shelf (COTS) WiFi routers with neither need to install any application on the user's MDs nor user's active cooperation. The system may be configured to acquire time-series historical location data of each MD and store them in a location database, for example.

Long-term residents of an indoor environment usually spend more time in the environment than do their visitors. Thus, the MDs that belong to residents may be associated with the residents and temporary devices may be filtered out according to their daily presence duration.

A person typically tends to own or otherwise have more than a single MD in his or her office. Therefore, all of the user's MDs may be classified into two categories: static devices (SDs) (e.g., laptops) and mobile phones (MPs), based on at least two criteria: location variations and overnight presences, for example.

In certain embodiments, a hierarchical clustering algorithm may be implemented to refine SD locations and assign each SD to the user such that the Euclidean distance between the centroid of the largest cluster of that SD's historical locations and the center of the user's personal zone is the minimum.

In order to find the correct mapping between each MP and its user's identification, each MP may be paired with a certain SD based on their duration of coexistence and their location similarity in time-series, for example.

The historical location data of a user's MP for his or her activity pattern analysis may be utilized. In order to associate each MD with its owner, the historical location data of each MD may be required. This data may be obtained using the WiFi-based IPS (WinIPS) disclosed herein that is capable of estimating the location of each MD precisely using existing WiFi infrastructure without user device modification or active user enrollment.

Unlike traditional WiFi-based IPSs which require users to install a dedicated application on their MDs to scan nearby WiFi routers for RSS data acquisition, the disclosed WinIPS enables COTS WiFi routers, also referred to herein as access points (APs), to overhear the data packets transmitted in the existing WiFi traffic in real-time without any intrusion on the user side.

Figure 1:
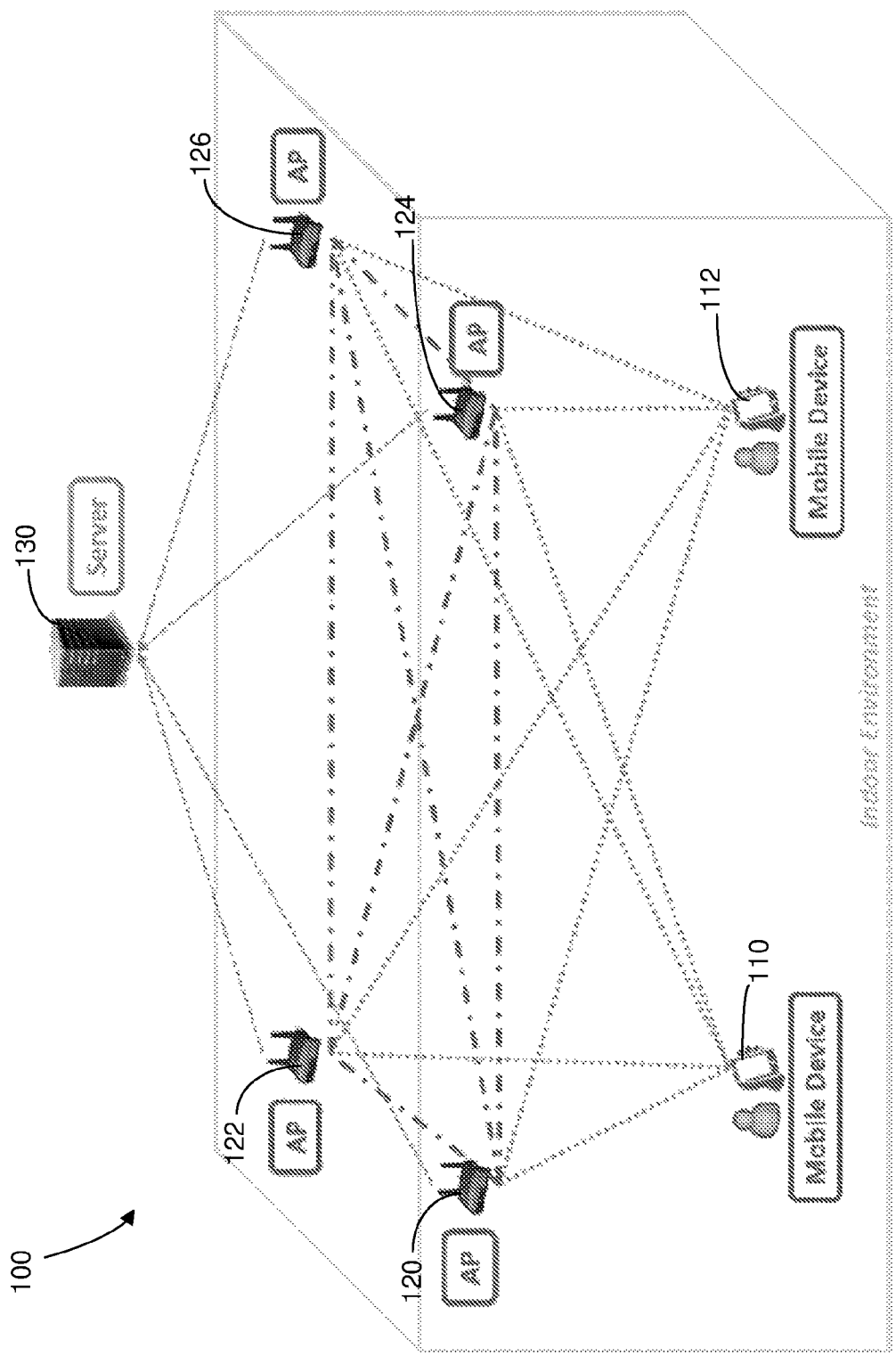
FIG. 1 illustrates an example of a system architecture in accordance with certain implementations of the disclosed technology.

FIG. 1 illustrates an example of a system architecture 100 in accordance with certain implementations of the disclosed technology. It consists of users with their MDs 110 and 112, existing COTS WiFi APs 120-126 deployed in the indoor environment, and a back-end server 130. At least certain portions of the system may be directly implemented on most COTS WiFi routers that support OpenWrt. In addition to providing wireless Internet services for users, the software of these Aps 120-126 may be upgraded such that they can monitor existing WiFi traffic and capture and analyze the data packets.

Due to the hardware restraint of the MDs 110 and 112, conventional active RSS scanning via MD suffers from limited sampling rate. On the contrary, the APs 120-126 can overhear sustainable amount of data packets generated by various existing applications on the MDs 110 and 112, such as periodic email fetching and data stream from watching videos (e.g., at a maximum rate of 100 packets per second without any modifications on the MDs 110 and 112).

Since the system may capture the data packets from existing WiFi traffic opportunistically, there is no additional battery burden on the MDs 110 and 112. Each AP extracts RSS values of the MDs 110 and 112 with their corresponding MAC addresses from the packets. The RSS values within one second, for example may be averaged out to remove the outliers since RSS should not vary dramatically within a short time because of the limited walking speed of a person in that amount of time (e.g., a second). After that, the RSS measurements and MAC address of each MD 110 and 112 captured by one or more of the APs 120-126 may be forwarded to the back-end server 130.

In certain embodiments, the back-end server 130 may receive and parse the data from the APs 120-126, estimate the location of each of the MDs 110 and 112 with the RSS readings, store the historical location estimations (e.g., in a MySQL location database). The back-end server 130 may also be responsible for the user and MD 110 and 112 association(s). With the RSS data from one or more of the APs 120-126, both signal propagation based and fingerprinting based localization algorithms can be utilized for location estimation.

In embodiments including a MySQL database, a SQL table may be created for each of the MDs 110 and 112 and use its MAC address as the ID of the table. The table may contain the historical location estimations in time-series in the format of timestamp and location of the MD at that timestamp as <timestamp, x, y>, for example. This data obtained by the system may provide the possibility to design a methodology (generally referred to herein as WinDUA) to advantageously realize MD 110 and 112 and user association for personalized context-aware and location-based services without the need of additional infrastructure and active cooperation from users.

MDs are typically present in indoor environments because they are carried by either resident of that environment (e.g., owners of the house and employees in the office) or invited friends and other visitors. Embodiments may include associating those MDs that belong to residents instead of visitors because residents usually spend more time in the physical space and their presence and activity patterns have a direct impact on the energy consumption of the building(s). Moreover, residents are typically the primary customer for personalized context-aware and location-based services.

Figure 2:
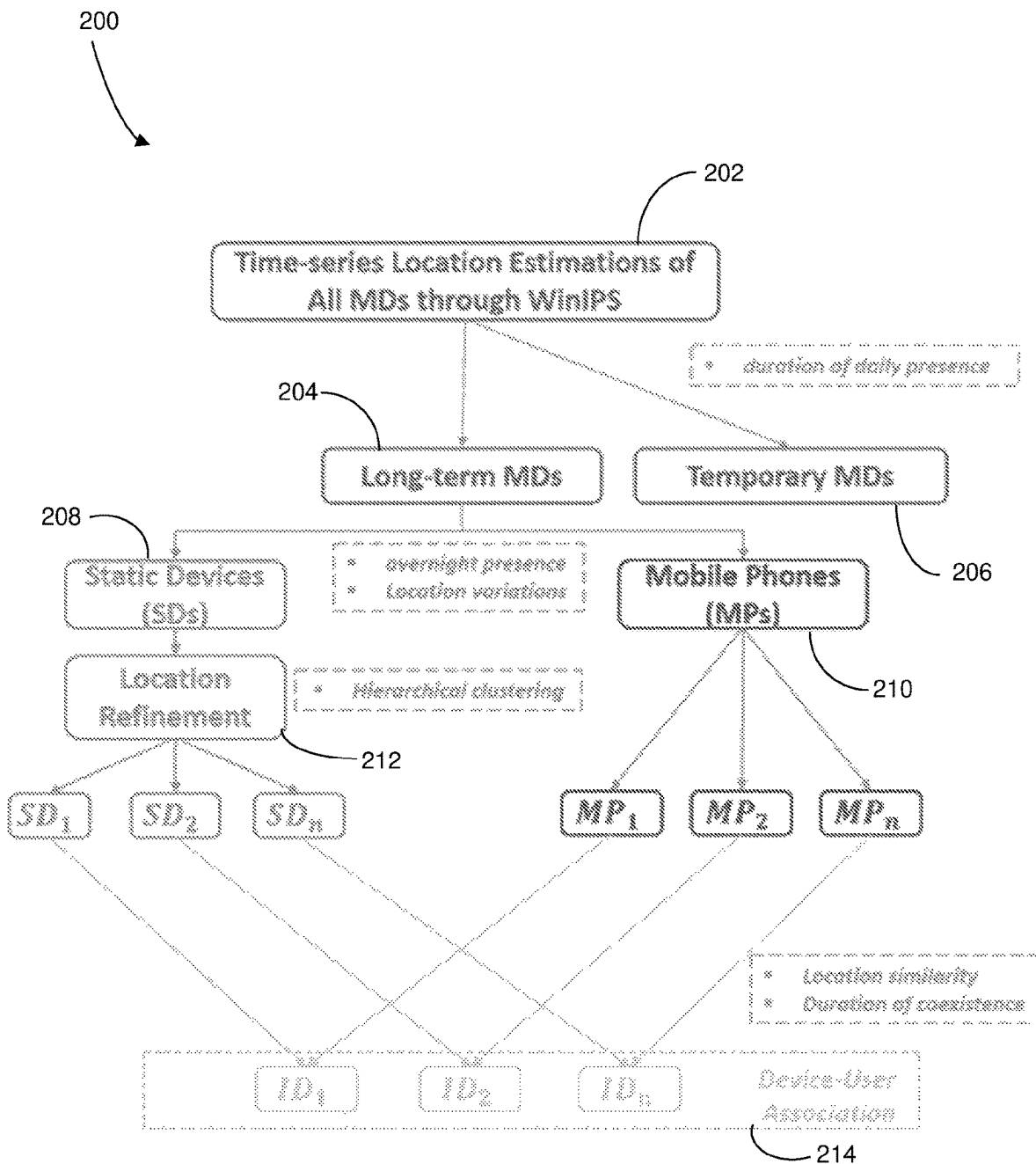
FIG. 2 illustrates an example of a flowchart of a method in accordance with certain implementations of the disclosed technology.

FIG. 2 illustrates an example of a flowchart of a method 200 in accordance with certain implementations of the disclosed technology. At 202, the system may obtain time-series location estimations of a number of MDs. The system may further designate each MD as a long-term MD, as indicated at 204, or as a temporary MD, as indicated at 206.

The system may further designate each long-term MD as a static device (SD), as indicated at 208, or as a mobile phone (MP), as indicated at 210. It will be appreciated that, as used herein, the term MP (e.g., as used at 210) is not necessarily limited to just phone devices and may include other portable electronic devices such as tablets, for example.

In certain embodiments, the system may further perform location refinement operations on any or all of the SDs, as indicated at 212. The system may also determine a device-user association for any or all of the long-term MDs, as indicated by 214 and described in detail below.

In a certain example, experiments were conducted in a 700 m² office with 25 long-term residents for 4 weeks and the system analyzed the duration of presence of each MD. The average stay time of temporary devices that were carried by visitors were commonly less than 2 hours per day. Thus, a threshold $\theta_t=2$ hours was set to filter out all the temporary devices whose daily stay time is less than $\theta_t$ in the location database.

With the increasing popularity of social networks and the proliferation of MDs, people usually carry at least one MD with them everywhere they go every day. Indeed, people tend to bring multiple MDs with them to workplaces (e.g., one mobile phone (MP) and one laptop). It is challenging to identify all of the MDs that belong to the same users.

In office environments, the mobility of a laptop is commonly less than a MP because people usually put the laptop in their personal office area most of the time. Thus, a laptop may be referred to as the static device (SD). SDs may be associated to their users firstly because their location variations are much smaller than MPs and they generally have higher correlations to the users' personal area (e.g., private office and personal cubicle), which is easier for MD and user association.

At least two criteria, overnight presence and location variation, may be used to identify whether a MD is a SD (208) or a MP (210). People normally leave their working laptops in the office after they leave work at the end of the workday. Thus, if an MD stays in an office overnight (e.g., $D_o$=12 am--6 am), it has a greater probability of being an SD. Meanwhile, the major difference between SDs and MPs is generally that a MP has a higher mobility than an SD because it is generally carried by a user everywhere in the office.

Thus, in addition to overnight presence $D_o$, a location standard deviation threshold $\sigma_l$ may be set as another criterion to classify MDs. Supposing location estimation of an MD stored in the location database, the location standard deviation may be calculated as follows:

$$\sigma = \sqrt{\frac{1}{m}\sum_{i=1}^{m}[(x_i - \bar{x})^2 + (y_i - \bar{y})^2]}$$

where $(\bar{x}, \bar{y})$ represents the mean of the location estimation. The location standard deviation threshold $\sigma_l$ depends on the location accuracy of the system and the common size of a personal zone in the office.

In certain embodiments, the disclosed system may achieve approximately 2 m localization accuracy on average. In the office where the disclosed example experiments were conducted, the average size of the personal zone was 6 m². Thus, $\sigma_1=4$ was set, which means if the standard deviation of an MD's location estimations stored in the database was lower than $\sigma_1$ and it appeared consistently in the overnight period $D_o$, it was identified as an SD (208); otherwise, the MD was identified as an MP (210).

After classifying all of the MDs into two classes (e.g., SDs 208 and MPs 210), the SDs may be associated to their most likely owners and then the owners of the MPs may be identified according to their co-mobility with users' SDs.

To associate the SDs to their owners, an unsupervised clustering algorithm may be used to refine the location of each SD. Ideally, a SD may remain within its user's personal zone almost all the time. However, in practice, a user could bring his or her SD (e.g., a laptop) to attend meetings in conference rooms or another user's personal zone for discussion from time to time. Thus, a model such as a Hierarchical Bayesian nonparametric (HBN) model may be used for clustering on the historical location estimations of each SD to group the locations into several clusters firstly.

Clustering algorithms generally seek to group together similar observations. Similar to the well-known Bayesian nonparametric clustering methods, the HBN model described herein may have the advantageous capability of adapting itself to find optimal number of clusters by the introduction of the Dirichlet process prior, for example.

The enhancement of HBN compared to the classical model, in addition, is that the new model may impose a scale-standardized distribution on cluster locations in each covariate as a prior. As such, it may encourage shrinkage on the locations towards a common mean which is able to prune out irrelevant dimensions and characterize the relative relevance of those remaining.

In this way, the model may achieve automatic representation learning in a lower dimensional space, and it can be a handy tool for the current problem, which exhibits irrelevant input dimensions due to the data collection procedure. Moreover, the disclosed HBN generally has high kurtosis, and a tendency to shrink small values to zero while performing little shrinkage on larger values.

To begin with, mixture distributions with a countably infinite number of components may be defined and implemented using a Dirichlet process prior on the mixture proportions. An auxiliary variable construction may be leveraged to impose the hierarchical structure on the latent allocation variables z and mixture weights w as follows:

$$\pi(z_i = k \mid w, u_i) \propto I(k : w_k > u_i), i = 1, \ldots, n,$$

$$u_i \sim U(0, 1), v_k \sim Be(1, \alpha), \alpha \sim Ga(a, b)$$

$$w_1 = v_1, w_k = v_1 \prod_{j=1}^{k-1}(1 - v_j), k > 1$$

where Be(•) and U(•) indicate the Beta and Uniform distribution, respectively, and they specify the Dirichlet process prior on the mixture weights w with concentration parameter $\alpha$. The density $$f_{w,\mu,\Sigma(x)} = \sum_{k=1}^{\infty} w_k N(x; \mu_k, \sum k),$$

can be written as the marginal of the joint density as $$f_{w,\mu,\Sigma(x,u)} = \sum_{k=1}^{\infty} I(w_k > u) N(x; \mu_k, \sum k).$$

Thus, if the set $A_u = k : w_k > u$ is finite and given the auxiliary variable u, the likelihood can be written as a summation over a finite number of terms as follows:

$$f_{w,\mu,\Sigma(x\mid u)} = \frac{1}{\sum_{k \in A_u} w_k} \sum_{k \in A_u} N(x; \mu_k, \sum k).$$

After that, only a finite number of allocations need to be considered instead of the infinite number. Only K* mixture components $(v_k, \mu_k, \Sigma k)$ such that $$\sum_{k=1}^{K^*} w_k > 1 - \min_i \{u_i\}$$

are need to simulate.

After the location refinement process, the centroid of the largest cluster as a robust statistic to present the position of the SD $(x_{SD}, y_{SD})$ for user association. Supposing the owner of each personal zone in the office is known, the Euclidean distance between the refined location of the SD and each center of personal zone may be calculated. Then, the SD may be assigned to the user that has the smallest Euclidean distance as follows:

$$\operatorname*{argmin}_j \sqrt{(x_{SD} - x_{P_j})^2 + (y_{SD} - y_{P_j})^2}$$

where $(x_{P_j}, y_{P_j})$ is the center location of j th personal zone.

After identifying the owner of each SD, the next step of the methodology (WinDUA) may include determining the owner of the MP. Since people commonly carry their MPs almost all the time with them everywhere (e.g., in the office), the MP is typically the best MD to represent the user's activities. However, it is often challenging to directly estimate the owner of the MP because its location distribution is diverse in general.

On the other hand, if a certain MP and a certain SD both belong to the same user, these two MDs should have a longer coexisting duration within that user's personal zone than other pairs would. Following this intuition, the MP and SD may be paired based on their duration of coexistence as well as the historical location similarity. If an MP makes a pair of an SD successfully, the conclusion may be that this MP and the SD belong to the same user.

Since the historical location estimations of each MP stored in the database are time series data, embodiments may include the system measuring the Euclidean distance between each of the MP's and SD's locations as their location similarity and counting their duration of coexistence in the same area.

For instance, if the distance between one MP and one SD becomes less than a location similarity threshold $D_s=1$ m for a small period of time $T_s=10$ minutes, this indicates that this MP could be a potential association candidate of this SD. Then, the system may start to measure the total duration of coexistence of these two devices and their time-series location differences in the next 5 days. The MP and the SD that have the longest coexisting duration and maintain their location difference is less than $D_s$ in 90% of this period, may be considered a successful pair.

In this manner, the correct MP may be identified to represent the user for activity pattern analysis, and thus advantageously provide them with seamless tailored location-based services and context-aware services without their psychical cooperation and any modifications on their MDs.

Figure 3:
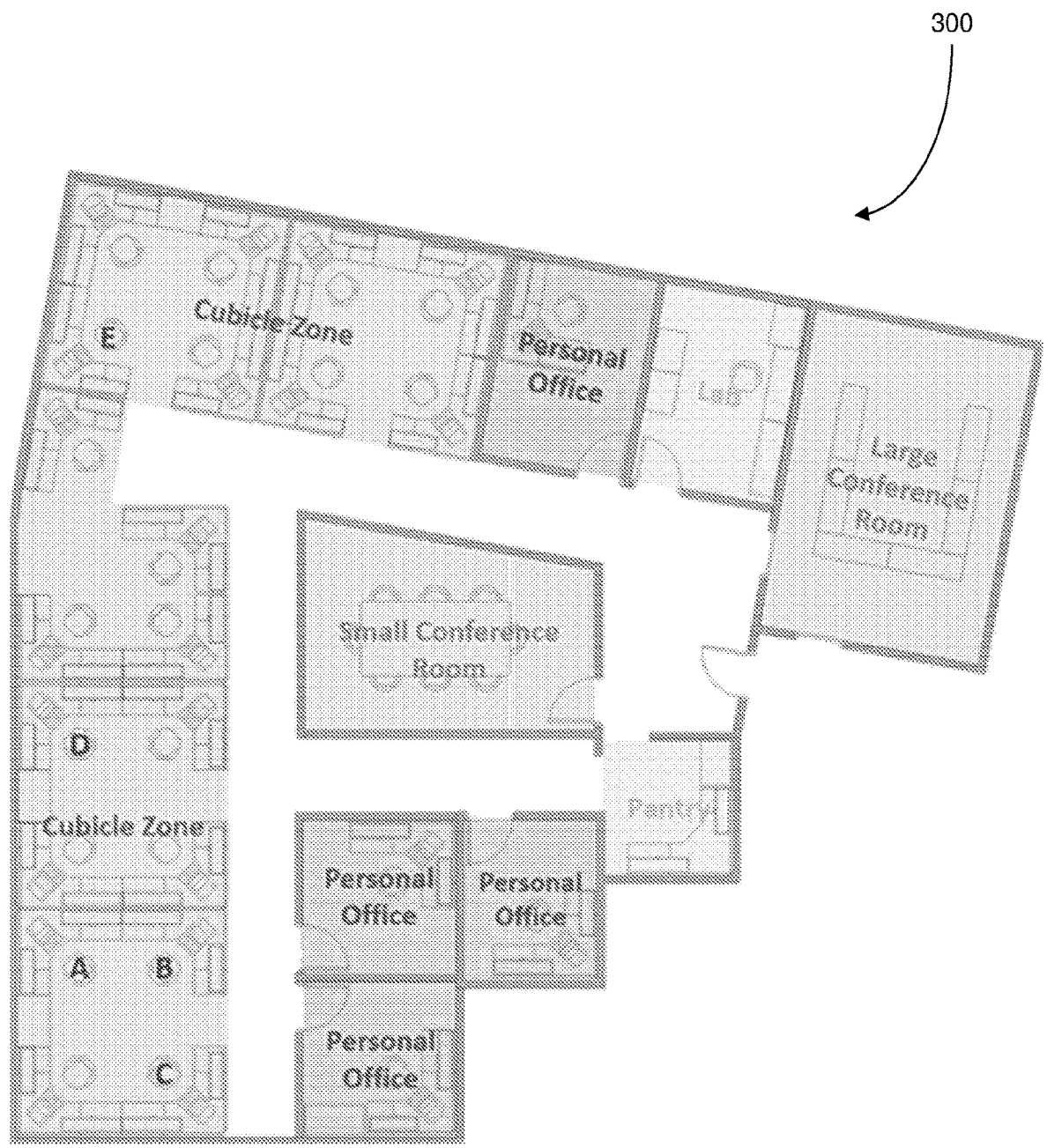
FIG. 3 illustrates an example layout of an office in accordance with a certain example experiment of the disclosed technology.

FIG. 3 illustrates an example layout 300 of an office in accordance with a certain example experiment of the disclosed technology. This example experiment was a four-week experiment that was conducted in a 700 m² multi-functional office to validate the MD and user association capability of the disclosed framework and methodology (WinDUA).

As demonstrated by FIG. 3, the area was composed of a large open space office with 20 cubicles, four personal offices, two conference rooms, one lab and one pantry area. To estimate the locations of the MDs in this example, nine routers were leveraged to build up the sensing network of the system (WinIPS). These routers were used as online reference points to update the radio map so that the system (WinIPS) was able to provide within 2 m localization accuracy consistently during the experiment.

Fifteen volunteers (of a total 26 residents working in the office) participated in the experiment. Some of the users brought both SDs and MPs to the office. There were 23 total MDs associated to the volunteers. The WiFi module of each MD was turned on during the experiment period. With the user's permission, the MAC address of each MD and its corresponding owner was recorded as the ground truth.

In the example four-week experiment, a device classification algorithm was implemented to identify whether each MD was likely carried by a resident or a visitor based on its daily presence duration. If the MD's daily stay time was less than 2 hours, it was considered a temporary device; otherwise, it was considered a long-term device.

In the experiment, the system (WinIPS) detected the presence of 307 MDs in total and, according to the designed criterion, 175 of them were classified as temporary devices. By analyzing the location distribution of these MDs, an observation was made that the MDs were mainly distributed in the conference rooms, pantry, and around the main entrance of the office, which implied that the MD's owners were more likely to be visitors rather than long-term residents. The location distribution of the long-term devices was evenly distributed over the entire office, e.g., because residents had access to occupy a wider space.

The geo-location heatmap of visitors obtained in this step could facilitate the ability of the building management system to explore activity patterns of visitors, and thus optimize the energy efficiency of lighting and heating, ventilation, and air conditions (HVAC) systems as well as the utility usage in the open and shared space, for example.

After identifying 132 MDs that were correlated to residents of the office, the system classified these MDs into two categories (e.g., static devices (SDs) and mobile phones (MPs)) based on their overnight presence and location variation. Among the 132 long-term MDs, 24 of them were identified as SDs and 108 of them were identified as MPs.

Figure 4:
FIG. 4 illustrates an example of location distribution of a number of user static devices and mobile phones in accordance with a certain example experiment of the disclosed technology.

FIG. 4 illustrates an example of location distribution 400 of a number of user static devices and mobile phones in accordance with the example experiment involving the office illustrated by FIG. 3. In this location distribution heatmap of all the SDs and MPs during the experimental period, the closer the color is to red, the higher the density, and the closer the color is to blue, the lower the density.

It can be observed from FIG. 4(a) that SDs were mainly distributed in cubical areas and personnel offices, while MPs appeared more frequently in the pantry and small and large conference rooms, as demonstrated by FIG. 4(b). This verifies the notion that MPs are generally better representatives for user activity pattern analysis than SDs.

Device and user association capability of the disclosed methodology (WinDUA) may be evaluated by estimating the owner of each SD, then trying to pair up possible MPs with SDs based on their coexisting duration, thereby identifying each MP's owner.

To identify the holder of each SD, the SD's location may be first refined using the disclosed Hierarchical clustering scheme, for example. After that, the centroid of the largest cluster may be adopted as the static location of the SD for user association. The SD may be assigned to the user that has the smallest Euclidean distance between the SD's location and the center of the user's personal zone. According to experimental results, the disclose methodology (WinDUA) may advantageously achieve 95.8% user association accuracy for SDs, for example.

Figure 5:
FIG. 5 illustrates an example of location distribution heatmaps of four static devices that were successfully associated with their users in accordance with a certain example experiment of the disclosed technology.

FIG. 5 demonstrates the location distribution heatmaps 500 of four SDs that were successfully associated with their correct users: (a) User A; (b) User E; (c) User C; and (d) User B. It can be observed from FIG. 5 that the location estimations of SDs are mainly distributed within the personal zone of their users, which verifies the assumption that SDs usually have smaller location variations than MPs and are thus easier for user identification, e.g., due to the high correlations to owners' personal zones.

The disclosed methodology (WinDUA) may determine the owner of each MP by estimating the possible pair between each MP and SD, and assigning the same holder of an SD to an MP that has the longest coexisting duration within that user's personal area. In an example, 11 MPs were successfully associated to their correct users using the disclosed association scheme.

Figure 6:
FIG. 6 illustrates an example of location distribution heatmaps of four mobile phones that were successfully associated with their users in accordance with a certain example experiment of the disclosed technology.

FIG. 6 demonstrates the location distribution heatmaps 600 of four MPs that were correctly associated with their owners: (a) User A; (b) User D; (c) User C; and (d) User B. Compared to the heatmaps 500 of FIG. 5, the heatmaps 600 of FIG. 600 validates the notion that MPs that have a wider location distribution than SDs belong to the same user in general, which thus indicates that they are better representatives for user's daily activities in the office.

A number of example case studies on human activity pattern analysis were performed according to the historical location data of users' MDs as obtained by the disclosed methodology (WinDUA). For example, FIG. 5(a) and FIG. 6(a) depict the location distribution heatmaps of one SD (a laptop) and one MP (an iPhone) that were accurately associated to User A. As shown in FIG. 6(a), User A also often appeared in the pantry, the lab, and the large conference room beside his or her personal cubicle.

Thus, the real-time usage of the lab may be notified to him or her during his or her historical frequent occupied time interval to improve the efficiency of his or her work. In addition, his or her personal preference of temperature and/or brightness level may be automatically applied in his frequently visited locations.

It will be appreciated that any of a number of other preferences and system settings may be adjusted, either automatically or pursuant to a request, based on the usage data as obtained and processed in accordance with the techniques described here.

Another successful device and user association achieved by the disclosed framework and methodology (WinDUA) is the association of User C with his or her SD (laptop) and MP (Android phone). The location distribution heatmaps of his or her laptop and phone are depicted in FIG. 5(c) and FIG. 6(c), respectively. It can be seen from these figures that the user's laptop and phone coexisted in his or her personal cubicle most of the time. Furthermore, another location hotspot for User C is the small conference room as presented in FIG. 6(c).

Coincidentally, FIG. 6(b) reveals that User D also regularly appeared in the same room. Therefore, activity patterns of both User C and User D may be analyzed based on their MPs' historical location data, e.g., to optimize the usage of the conference room and/or avoid the conflict of usage.

FIG. 5(d) and FIG. 6(d) illustrate another successful device and user association for User B. Similar to the analysis for User C, an insight that may be obtained from FIG. 6(d) is that User B often visited the large conference room. Thus, tailored location-based services, such as personalized thermal comfort, for example, may be implemented automatically when he or she is in the large conference room.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. A mobile device and user association system, comprising:

a plurality of wireless routers each configured to execute software to enable it to capture data including a received signal strength (RSS) value and a media access controller (MAC) address for each of a plurality of mobile devices (MDs) from existing wireless fidelity (WiFi) traffic;

a SQL database configured to create a table for each MD and use the MAC address corresponding to each MD as the ID of the corresponding table, wherein each table includes historical location estimations in time-series; and at least one server configured to receive the data including the RSS values and MAC addresses of the plurality of MDs from the plurality of wireless routers and the MD tables from the SQL database to estimate a location of each MD and generate historical location data of each MD, identify and filter out temporary MDs, classify each non-temporary MD as either a static device (SD) or a mobile phone (MP), and associate each of a plurality of users with each SD and MP, wherein each of the plurality of wireless routers is further configured to provide wireless Internet access service to the plurality of MDs by constructing a WiFi LAN network within the indoor environment, and overhear data packets transmitted between the plurality of MDs and other wireless routers from the existing WiFi traffic, wherein the data packets are generated by applications running on the plurality of MDs, wherein the applications running on the plurality of MDs include at least one of the following: push notifications and email fetches, wherein the at least one server is configured to classify non-temporary MDs as either an SD or an MP based at least in part on location variations and overnight presences of each MD, and wherein the classifying includes calculating a location standard deviation threshold using the following equation:

$$\sigma = \sqrt{\frac{1}{m}\sum_{i=1}^{m}\left[(x_i - \bar{x})^2 + (y_i - \bar{y})^2\right]}$$

where (x, y) represents the mean of the location estimation.

2. The system of claim 1, wherein each of the plurality of MDs is located, at least temporarily, within an indoor environment having a floor plan.

3. The system of claim 2, wherein each user is either a long-term resident of the indoor environment or a visitor, and wherein the floor plan includes at least one predefined personal zone for each long-term resident.

4. The system of claim 3, wherein each predefined personal zone includes at least one of the following: a personal office, a cubicle, a pantry, and a conference room.

5. The system of claim 1, wherein each of the plurality of MDs is configured to receive and transmit data packets through a WiFi radio signal.

6. The system of claim 1, wherein the historical location estimations of each MD are in the format of timestamp and location of the MD at that timestamp is <timestamp, x, y>.

7. The system of claim 1, wherein the at least one server is configured to filter out temporary MDs based on a daily presence duration of each MD.

8. The system of claim 1, wherein the at least one server is configured to associate a user with an SD based on a determination that a Euclidean distance between a centroid of a largest cluster of the SD's historical locations and a center of a user's personal zone is a minimum.

9. The system of claim 1, wherein the at least one server is further configured to generate a pair for each MP with an SD based on a duration of coexistence and location similarity in time-series between the MP and the SD.

10. The system of claim 9, wherein the at least one server is further configured to obtain a correct mapping between each MP and its user identification based on the generated pair.

11. The system of claim 1, wherein the at least one server is further configured to perform a personalized activity analysis based on the historical location data of each MP.

12. A mobile device and user association system, comprising:
a plurality of wireless routers each configured to execute software to enable it to capture data including a received signal strength (RSS) value and a media access controller (MAC) address for each of a plurality of mobile devices (MDs) from existing wireless fidelity (WiFi) traffic;
a SQL database configured to create a table for each MD and use the MAC address corresponding to each MD as the ID of the corresponding table, wherein each table includes historical location estimations in time-series, wherein the SQL database is further configured to store time-series historical location data of each MD; and
at least one server configured to receive the data including the RSS values and MAC addresses of the plurality of MDs from the plurality of wireless routers and the MD tables from the SQL database to estimate a location of each MD and generate historical location data of each MD, identify and filter out temporary MDs, classify each non-temporary MD as either a static device (SD) or a mobile phone (MP), and associate each of a plurality of users with each SD and MP, wherein the at least one server is configured to estimate the location of each MD using a fingerprinting based localization algorithm, wherein the historical location data of a user's MP for his or her activity pattern analysis may be utilized, wherein each of the plurality of wireless routers is further configured to provide wireless Internet access service to the plurality of MDs by constructing a WiFi LAN network within the indoor environment, and overhear data packets transmitted between the plurality of MDs and other wireless routers from the existing WiFi traffic.

13. The system of claim 12, wherein each of the plurality of wireless routers is further configured to extract the RSS values and MAC addresses of the plurality of MDs from the overheard data packets.

14. The system of claim 13, wherein each of the plurality of wireless routers is further configured to arrange the RSS values and MAC addresses of the plurality of MDs in a predefined format, and send the arranged RSS values and MAC addresses of the plurality of MDs to the at least one server.

15. The system of claim 12, wherein the data packets are generated by applications running on the plurality of MDs.

16. A mobile device and user association system, comprising:
a plurality of wireless routers each configured to execute software to enable it to capture data including a received signal strength (RSS) value and a media access controller (MAC) address for each of a plurality of mobile devices (MDs) from existing wireless fidelity (WiFi) traffic;
a SQL database configured to create a table for each MD and use the MAC address corresponding to each MD as the ID of the corresponding table, wherein each table includes historical location estimations in time-series; and
at least one server configured to receive the data including the RSS values and MAC addresses of the plurality of MDs from the plurality of wireless routers and the MD tables from the SQL database to estimate a location of each MD and generate historical location data of each MD, identify and filter out temporary MDs, classify each non-temporary MD as either a static device (SD) or a mobile phone (MP), and associate each of a plurality of users with each SD and MP,
wherein the at least one server is further configured to refine an estimated location of each SD based on an unsupervised clustering model, and
wherein mixture distributions with a countably infinite number of components may be defined and implemented using a Dirichlet process prior on mixture proportions, by leveraging an auxiliary variable construction to impose hierarchical structure on latent allocation variables z and mixture weights w as follows:

$$\pi(z_i = k \mid w, u_j) \propto I(k : w_k > u_i), i = 1, \ldots, n,$$

$$u_i \sim U(0, 1), v_k \sim Be(1, \alpha), \alpha \sim Ga(a, b)$$

$$w_1 = v_1, w_k = v_1 \prod_{j=1}^{k-1}(1 - v_j), k > 1$$

where Be( ) and U( ) indicate Beta and Uniform distribution, respectively, and specify the Dirichlet process prior on the mixture weights w with concentration parameter α.

17. The system of claim 16, wherein the unsupervised clustering model is a Hierarchical Bayesian nonparametric (HBN) model.

\* \* \* \* \*